(12) United States Patent
Sethi et al.

(10) Patent No.: US 11,687,431 B2
(45) Date of Patent: Jun. 27, 2023

(54) DETERMINING CHANGES TO COMPONENTS OF A COMPUTING DEVICE PRIOR TO BOOTING TO A PRIMARY ENVIRONMENT OF THE COMPUTING DEVICE

(71) Applicant: Dell Products L.P., Round Rock, TX (US)

(72) Inventors: Parminder Singh Sethi, Ludhiana (IN); Lakshmi Saroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 202 days.

(21) Appl. No.: 17/151,459

(22) Filed: Jan. 18, 2021

(65) Prior Publication Data
US 2022/0229754 A1 Jul. 21, 2022

(51) Int. Cl.
*G06F 11/30* (2006.01)
*G06F 11/34* (2006.01)
(Continued)

(52) U.S. Cl.
CPC ...... *G06F 11/3051* (2013.01); *G06F 11/3065* (2013.01); *G06F 11/3495* (2013.01); *G06F 9/4401* (2013.01); *H04L 63/168* (2013.01)

(58) Field of Classification Search
None
See application file for complete search history.

(56) References Cited

U.S. PATENT DOCUMENTS 8,171,272 B1 * 5/2012 Chester ............... G06F 11/004
713/1
8,712,968 B1 * 4/2014 Chester ............... G06F 11/1417
707/649

(Continued)

OTHER PUBLICATIONS

Dell Technologies, "Using BIOSConnect to Recover SupportAssist OS Recovery Partition," https://www.dell.com/support/kbdoc/en-th/000177771/using-biosconnect-to-recover-supportassist-os-recovery-partition, Dec. 5, 2020, 9 pages.

(Continued)

*Primary Examiner* — Danny Chan
(74) *Attorney, Agent, or Firm* — Ryan, Mason & Lewis, LLP

(57) ABSTRACT

An apparatus comprises a processing device configured to receive a request to boot a given computing device to a primary environment and, responsive to receiving the request, to obtain first inventory information for components of the given computing device utilizing a preinstallation environment of the given computing device. The processing device is also configured to analyze the first inventory information and second inventory information to determine whether there are any changes in the components of the given computing device prior to booting the given computing device to the primary environment, the second inventory information being previously stored in a support environment of the given computing device. The processing device is further configured to generate notifications based at least in part on determining that there are one or more changes in the components of the given computing device, and to provide the notifications at a user interface of the given computing device.

20 Claims, 13 Drawing Sheets

(51) Int. Cl.
   *G06F 9/4401*    (2018.01)
   *H04L 9/40*      (2022.01)

(56) References Cited

U.S. PATENT DOCUMENTS

| | | | | |
|---|---|---|---|---|
| 10,191,729 | B2* | 1/2019 | Lee-Baron | G06F 8/61 |
| 10,572,366 | B1* | 2/2020 | Raju | G06F 11/3065 |
| 2004/0078497 | A1* | 4/2004 | Nalawadi | G06F 21/575 |
| | | | | 710/8 |
| 2005/0071442 | A1* | 3/2005 | Becker | H04L 41/12 |
| | | | | 709/220 |
| 2011/0264594 | A1* | 10/2011 | Govindaraju | G06Q 30/012 |
| | | | | 705/302 |
| 2012/0042195 | A1* | 2/2012 | Marinelli | G06F 11/0793 |
| | | | | 714/E11.138 |
| 2019/0156039 | A1* | 5/2019 | Harsany | G06F 21/568 |
| 2019/0236279 | A1* | 8/2019 | Depew | G06F 9/44505 |
| 2021/0240491 | A1* | 8/2021 | Downum | G06F 9/546 |
| 2022/0207145 | A1* | 6/2022 | Young | G06F 21/575 |

OTHER PUBLICATIONS

Dell Technologies, "Restore Your System Using Dell SupportAssist OS Recovery," https://www.dell.com/support/kbdoc/en-us/000177401/restore-your-system-using-dell-supportassist-os-recovery, Dec. 5, 2020, 7 pages.

Microsoft Docs, "What is PowerShell?" https://docs.microsoft.com/en-us/powershell/scripting/overview?view=powershell-7.1, May 22, 2020, 4 pages.

Microsoft Docs, "Windows PE (WinPE)" https://docs.microsoft.com/en-us/windows-hardware/manufacture/desktop/winpe-intro, Oct. 2, 2018, 4 pages.

Microsoft Docs, "Getting WMI Objects (Get—CimInstance)" https://docs.microsoft.com/en-us/powershell/scripting/samples/getting-wmi-objects--get-wmiobject-?view=powershell-7, Dec. 23, 2019, 6 pages.

* cited by examiner

```
PS C:\Users\Sample_User> Get-WMIObject Win32_PhysicalMedia

__GENUS                 : 2
__CLASS                 : Win32_PhysicalMedia
__SUPERCLASS            : CIM_PhysicalMedia
__DYNASTY               : CIM_ManagedSystemElement
__RELPATH               : Win32_PhysicalMedia.Tag="\\\\.\\PHYSICALDRIVE0"
__PROPERTY_COUNT        : 23
__DERIVATION            : {CIM_PhysicalMedia, CIM_PhysicalComponent, CIM_PhysicalElement, CIM_ManagedSystemElement}
__SERVER                : SAMPLE_SERVER
__NAMESPACE             : root\cimv2
__PATH                  : \\SAMPLE_SERVER\root\cimv2:Win32_PhysicalMedia.Tag="\\\\.\\PHYSICALDRIVE0"
Capacity                :
Caption                 :
CleanerMedia            :
CreationClassName       :
Description             :
HotSwappable            :
InstallDate             :
Manufacturer            :
MediaDescription        :
MediaType               :
Model                   :
Name                    :
OtherIdentifyingInfo    :
PartNumber              :
PoweredOn               :
Removable               :
Replaceable             :
SerialNumber            : SAMPLE_SERIAL_NUMBER
SKU                     :
Status                  :
Tag                     : \\.\PHYSICALDRIVE0
Version                 :
WriteProtectOn          :
PSComputerName          : SAMPLE_SERVER
```

```
PS C:\Users\Sample_User> Get-WMIObject win32_keyboard

__GENUS                        : 2
__CLASS                        : Win32_Keyboard
__SUPERCLASS                   : CIM_Keyboard
__DYNASTY                      : CIM_ManagedSystemElement
__RELPATH                      : Win32_Keyboard.DeviceID="HID\\CONVERTEDDEVICE&COL01\\ABCDEFGH"
__PROPERTY_COUNT               : 23
__DERIVATION                   : {CIM_Keyboard, CIM_UserDevice, CIM_LogicalDevice, CIM_LogicalElement...}
__SERVER                       : SAMPLE_SERVER
__NAMESPACE                    : root\cimv2
__PATH                         : \\SAMPLE_SERVER\root\cimv2:Win32_Keyboard.DeviceID="HID\\CONVERTEDDEVICE&COL01\\ABCDEFGH"

Availability                   :
Caption                        : Enhanced (101- or 102-key)
ConfigManagerErrorCode         : 0
ConfigManagerUserConfig        : False
CreationClassName              : Win32_Keyboard
Description                    : HID Keyboard Device
DeviceID                       : HID\CONVERTEDDEVICE&COL01\ABCDEFGH
ErrorCleared                   :
ErrorDescription               :
InstallDate                    :
IsLocked                       :
LastErrorCode                  :
Layout                         : 00000409
Name                           : Enhanced (101- or 102-key)
NumberOfFunctionKeys           : 12
Password                       :
PNPDeviceID                    : HID\CONVERTEDDEVICE&COL01\ABCDEFGH
PowerManagementCapabilities    :
PowerManagementSupported       : False
Status                         : OK
StatusInfo                     :
SystemCreationClassName        : Win32_ComputerSystem
SystemName                     : SAMPLE_SERVER
PSComputerName                 : SAMPLE_SERVER
...
```

FIG. 6B 605-2

```
__GENUS                      : 2
__CLASS                      : Win32_Keyboard
__SUPERCLASS                 : CIM_Keyboard
__DYNASTY                    : CIM_ManagedSystemElement
__RELPATH                    : Win32_Keyboard.DeviceID="ACPI\\JKLMNOPQ\RSTUVWXY"
__PROPERTY_COUNT             : 23
__DERIVATION                 : {CIM_Keyboard, CIM_UserDevice, CIM_LogicalDevice, CIM_LogicalElement...}
__SERVER                     : SAMPLE_SERVER
__NAMESPACE                  : root\cimv2
__PATH                       : \\SAMPLE_SERVER\root\cimv2:Win32_Keyboard.DeviceID="ACPI\\JKLMNOPQ\RSTUVWXY"
Availability                 :
Caption                      : Enhanced (101- or 102-key)
ConfigManagerErrorCode       : 0
ConfigManagerUserConfig      : False
CreationClassName            : Win32_Keyboard
Description                  : Standard PS/2 Keyboard
DeviceID                     : ACPI\\JKLMNOPQRSTUVWXY
ErrorCleared                 :
ErrorDescription             :
InstallDate                  :
IsLocked                     :
LastErrorCode                :
Layout                       : 00000409
Name                         : Enhanced (101- or 102-key)
NumberOfFunctionKeys         : 12
Password                     :
PNPDeviceID                  : ACPI\\JKLMNOPQ\RSTUVWXY
PowerManagementCapabilities  :
PowerManagementSupported     : False
Status                       : OK
StatusInfo                   :
SystemCreationClassName      : Win32_ComputerSystem
SystemName                   : SAMPLE_SERVER
PSComputerName               : SAMPLE_SERVER
...
```

FIG. 6C

```
PS C:\Users\Sample_User> Get-WMIObject win32_BaseBoard

Manufacturer   : SAMPLE_MANUFACTURER
Model          :
Name           : Base Board
SerialNumber   : SAMPLE_SERIAL_NUMBER
SKU            :
Product        : SAMPLE_PRODUCT_NUMBER
```

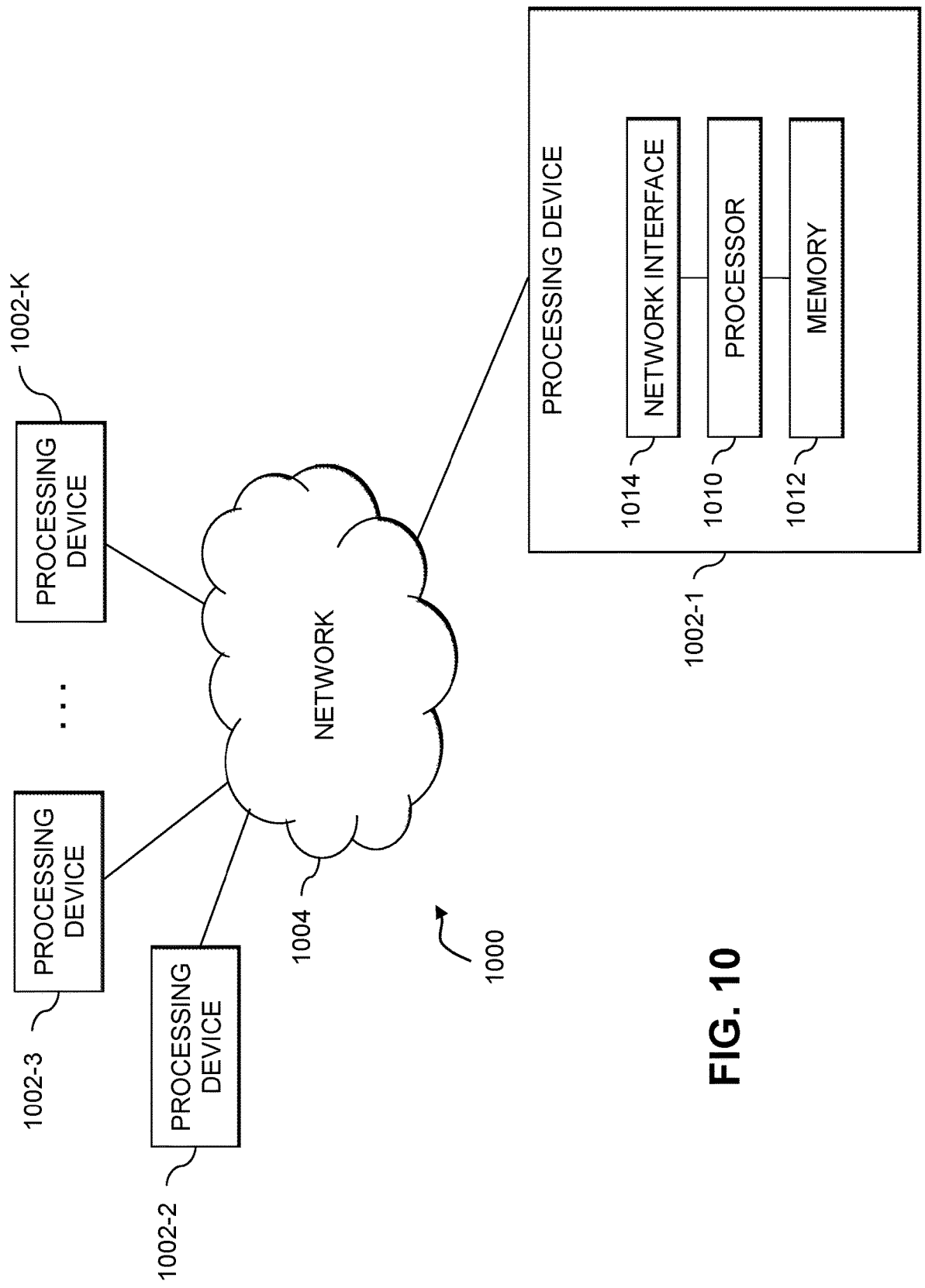

DETERMINING CHANGES TO COMPONENTS OF A COMPUTING DEVICE PRIOR TO BOOTING TO A PRIMARY ENVIRONMENT OF THE COMPUTING DEVICE

FIELD

The field relates generally to information processing, and more particularly to device management in information processing systems.

BACKGROUND

Support platforms may be utilized to provide various services for computing devices managed by the support platforms. Such services may include, for example, troubleshooting and remediation of issues encountered on computing devices managed by a support platform. This may include periodically collecting information on the state of the managed computing devices, and using such information for troubleshooting and remediation of the issues. Services of a support platform may also or alternatively include management of software that is installed on computing devices. This may include various software vendors communicating with the support platform when upgrades are available for different applications or other software, and the support platform may push such upgrades to the computing devices that it manages.

SUMMARY

Illustrative embodiments of the present disclosure provide techniques for determining changes to components of a computing device prior to booting to a primary environment of the computing device.

In one embodiment, an apparatus comprises at least one processing device comprising a processor coupled to a memory. The at least one processing device is configured to perform the steps of receiving a request to boot a given computing device to a primary environment and, responsive to receiving the request to boot the given computing device to the primary environment, obtaining first inventory information for components of the given computing device utilizing a preinstallation environment of the given computing device. The at least one processing device is also configured to perform the step of analyzing the first inventory information for the components of the given computing device and second inventory information for the components of the given computing device to determine whether there any changes in the components of the given computing device prior to booting the given computing device to the primary environment, the second inventory information being previously stored in a support environment of the given computing device. The at least one processing device is further configured to perform the steps of generating one or more notifications based at least in part on determining that there are one or more changes in the components of the given computing device, and providing the one or more notifications at a user interface of the given computing device.

These and other illustrative embodiments include, without limitation, methods, apparatus, networks, systems and processor-readable storage media.

BRIEF DESCRIPTION OF THE DRAWINGS

FIGS. 6A-6D show pseudocode of commands for obtaining device information in an illustrative embodiment.

FIGS. 9 and 10 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
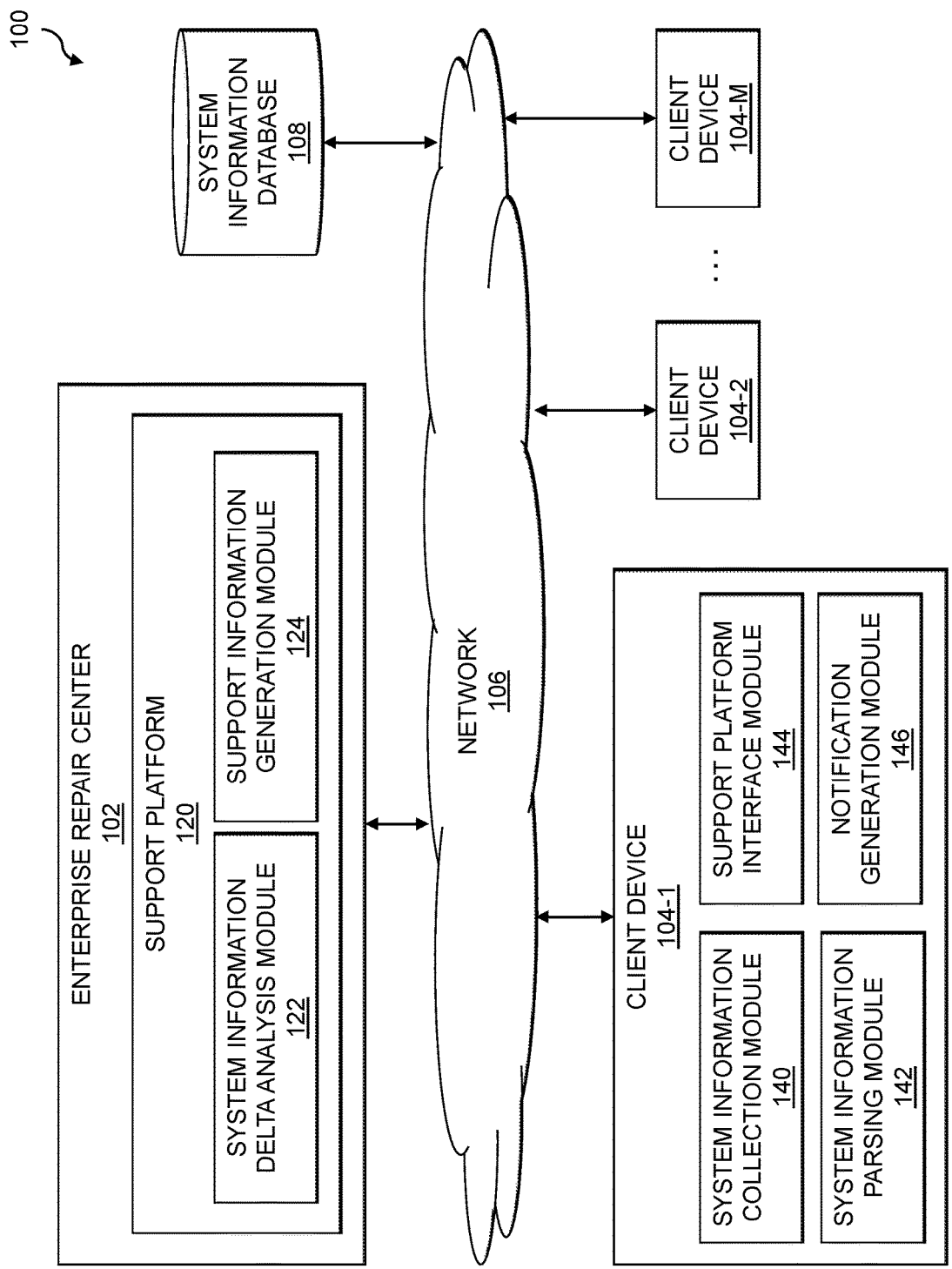
FIG. 1 is a block diagram of an information processing system configured for determining changes to components of a computing device prior to booting to a primary environment of the computing device in an illustrative embodiment.

FIG. 1 shows an information processing system 100 configured in accordance with an illustrative embodiment. The information processing system 100 is assumed to be built on at least one processing platform and provides functionality for determining changes to components of a computing device prior to booting to a primary environment of the computing device. The information processing system 100 includes an enterprise repair center 102 and a plurality of client devices 104-1, 104-2, . . . 104-M (collectively, client devices 104) that are coupled to a network 106. Also coupled to the network 106 is a system information database 108, which may store various information relating to the client devices 104 (e.g., device telemetry data).

The enterprise repair center 102 in the FIG. 1 embodiment includes a support platform 120, which is assumed to provide support services for the client devices 104. The client devices 104 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as virtual machines (VMs), containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art. In some embodiments, the client devices 104 comprise assets of an information technology (IT) infrastructure operated by an enterprise, and the enterprise repair center 102 is configured to provide support services for such assets using the support platform 120.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

As noted above, in some embodiments the support platform 120 of the enterprise repair center 102 is used for providing support services for an enterprise system (e.g., an IT infrastructure comprising the client devices 104). For example, an enterprise may subscribe to or otherwise utilize the support platform 120 to manage a set of assets (e.g., the client devices 104) operated by users of the enterprise. As used herein, the term "enterprise system" is intended to be construed broadly to include any group of systems or other computing devices. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The system information database 108, as discussed above, is configured to store and record information relating to the client devices 104 or other assets that are managed using the support platform 120. Such information illustratively includes device or system state information, logs of repairs and troubleshooting actions performed on the client devices 104, details of warranties or other support services subscribed to for different ones of the client devices 104, etc. The system information database 108 in some embodiments is implemented using one or more storage systems or devices associated with the support platform 120. In some embodiments, one or more of the storage systems utilized to implement the system information database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise repair center 102 and/or support platform 120, as well as to support communication between the enterprise repair center 102, the support platform 120 and other related systems and devices not explicitly shown.

The support platform 120 may be operated by a hardware vendor that manufactures and sells computing devices (e.g., desktops, laptops, tablets, smartphones, etc.), and the client devices 104 may represent computing devices sold by that hardware vendor. The support platform 120, however, is not required to be operated by a hardware vendor that manufactures and sells computing devices. Instead, the support platform 120 may be offered as a service to provide support for computing devices that are sold by any number of hardware vendors. The client devices 104 may subscribe to the support platform 120, so as to provide support including management of upgrades for applications or other software of the client devices 104. Various other examples are possible.

In some embodiments, the client devices 104 may implement host agents that are configured for automated transmission of information regarding state of the client devices 104 (e.g., such as in the form of telemetry information periodically provided to the support platform 120). Such host agents may also be configured to automatically receive from the support platform 120 various support information (e.g., details of troubleshooting and repair actions performed on or for the client devices 104, support services that are available to the client devices 104, etc.). The host agents may comprise support software that is installed on the client devices 104. As will be described in further detail below, such support software may include a dedicated support recovery operating system (OS) installed on the client devices 104, support clients or other software installed in a user space of the client devices 104, etc.

It should be noted that a "host agent" as this term is generally used herein may comprise an automated entity, such as a software entity running on a processing device. Accordingly, a host agent need not be a human entity.

As shown in FIG. 1, the enterprise repair center 102 includes the support platform 120. The support platform, as will be described in further detail below, is configured to determine changes to components of the client devices 104 prior to the client devices 104 booting to their respective primary environments (e.g., primary or base operating systems (OSes)).

Although shown as an element of the enterprise repair center 102 in this embodiment, the support platform 120 in other embodiments can be implemented at least in part externally to the enterprise repair center 102, for example, as a stand-alone server, set of servers or other type of system coupled to the network 106. In some embodiments, the support platform 120 or components thereof may be implemented at least in part within one or more of the client devices 104.

The client devices 104 and the support platform 120 in the FIG. 1 embodiment are assumed to be implemented using at least one processing device. Each such processing device generally comprises at least one processor and an associated memory, and implements one or more functional modules for controlling certain features of the client devices 104 and the support platform 120. In the FIG. 1 embodiment, the client device 104-1 includes a system information collection module 140, a system information parsing module 142, a support platform interface module 144 and a notification generation module 146. Although not explicitly shown in FIG. 1 for clarity of illustration, it is assumed that other ones of the client devices 104-2 through 104-M may be similarly configured with respective system information collection modules, system information parsing modules, support platform interface modules, and notification generation modules 146. The support platform 120 includes a system information delta analysis module 122 and a support information generation module 124.

The client device 104-1 is configured to utilize the system information collection module 140 to collect various telemetry data from the client device 104-1. The system information parsing module 142 is configured to parse the telemetry data of the client device 104-1, so as to identify system inventory information for components of the client device 104-1. The components illustratively include hardware components of the client device 104-1 (e.g., motherboard, storage devices, processors, memory, peripheral or expansion cards, keyboards and other input devices, etc.). The support platform interface module 144 is configured to determine a "delta" between current and previously stored inventory information (e.g., inventory information stored by support software operating in a primary environment of the client device 104-1 before going offline). The telemetry data collected by the system information collection module 140 and parsed using the system information parsing module 142 is used to determine the current inventory information, and may be performed in or using a support environment of the client device 104-1 (e.g., a support recovery operating system (OS)) that is configured to execute independent of the primary environment (e.g., a primary or base OS) of the client device 104-1.

The support platform interface module 144, on detecting that there is a delta between the current and previously stored inventory information, communicates with the support platform 120. The support platform 120 utilizes the system information delta analysis module 122 to analyze the delta and identify the changes to the components of the client device 104-1. The support information generation module 124 generates support information for the client device 104-1 (e.g., indications of a purchase date of the client device 104-1, warranty information for the client device 104-1, troubleshooting and repair actions performed on the client device 104-1, etc.). Such support information is provided back to the support platform interface module 144, and used by the notification generation module 146 to generate notifications output to a user interface of the client device 104-1. Such notifications may indicate the changes in the inventory information and associated support details as described elsewhere herein.

It is to be appreciated that the particular arrangement of the client device 104-1, the system information collection module 140, the system information parsing module 142, the support platform interface module 144, the notification generation module 146, the enterprise repair center 102, the support platform 120, the system information delta analysis module 122, and the support information generation module 124 illustrated in the FIG. 1 embodiment is presented by way of example only, and alternative arrangements can be used in other embodiments. As discussed above, for example, the support platform 120 or one or more components thereof may be implemented external to the enterprise repair center 102. As another example, the functionality associated with the system information collection module 140, the system information parsing module 142, the support platform interface module 144, the notification generation module 146, the system information delta analysis module 122, and the support information generation module 124 may be combined into fewer modules, or separated across more modules with the multiple modules possibly being implemented with multiple distinct processors or processing devices.

At least portions of the system information collection module 140, the system information parsing module 142, the support platform interface module 144, the notification generation module 146, the system information delta analysis module 122, and the support information generation module 124 may be implemented at least in part in the form of software that is stored in memory and executed by a processor.

It is to be understood that the particular set of elements shown in FIG. 1 for determining changes to components of the client devices 104 prior to booting to primary environments of the client devices 104 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the support platform 120 may be implemented external to the enterprise repair center 102, such that the enterprise repair center 102 can be eliminated.

The support platform 120 and other portions of the system 100, as will be described in further detail below, may be part of cloud infrastructure.

The client devices 104, the support platform 120 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 104 and the support platform 120, or components thereof, may be implemented on respective distinct processing platforms, although numerous other arrangements are possible. For example, in some embodiments at least portions of the support platform 120 and one or more of the client devices 104 are implemented on the same processing platform. A given client device (e.g., 104-1) can therefore be implemented at least in part within at least one processing platform that implements at least a portion of the support platform 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the enterprise repair center 102, the support platform and the client devices 104, the system information database 108, or portions or components thereof, to reside in different data centers. Numerous other distributed implementations are possible. The support platform 120 can also be implemented in a distributed manner across multiple data centers.

Additional examples of processing platforms utilized to implement the client devices 104, support platform 120 and other components of the system 100 in illustrative embodiments will be described in more detail below in conjunction with FIGS. 9 and 10.

It is to be appreciated that these and other features of illustrative embodiments are presented by way of example only, and should not be construed as limiting in any way.

An exemplary process for determining changes to components of a computing device prior to booting to a primary environment of the computing device will now be described in more detail with reference to the flow diagram of FIG. 2. It is to be understood that this particular process is only an example, and that additional or alternative processes for determining changes to components of a computing device prior to booting to a primary environment of the computing device may be used in other embodiments.

In this embodiment, the process includes steps 200 through 208. These steps are assumed to be performed by the client device 104-1 utilizing the system information collection module 140, the system information parsing module 142, the support platform interface module 144 and the notification generation module 146, and by the support platform 120 utilizing the system information delta analysis module 122 and the support information generation module 124. The process begins with step 200, receiving a request to boot a given computing device (e.g., client device 104-1) to a primary environment. Responsive to receiving the request to boot the given computing device to the primary environment in step 200, first inventory information for components of the given computing device are obtained in step 202 utilizing a preinstallation environment of the given computing device.

In step 204, the first inventory information for the components of the given computing device and second inventory information for the components of the given computing device are analyzed to determine whether there any changes in the components of the given computing device prior to booting the given computing device to the primary environment. The second inventory information being previously stored in a support environment of the given computing device. Step 204 may be performed responsive to failure to boot the given computing device to the primary environment.

The primary environment may comprise a base OS of the given computing device, and the support environment may comprise a support recovery OS of the given computing device. The steps of the FIG. 2 process may be performed in the support recovery OS, which is configured to run independent of the base OS of the given computing device. The first inventory information and the second inventory information may comprise hardware device details for the components of the given computing device and universally unique identifiers (UUIDs) for the components of the given computing device. The second inventory information may be stored in the support environment by a support software client executing in the primary environment of the given computing device prior to the primary environment of the given computing device going offline.

Figure 2:
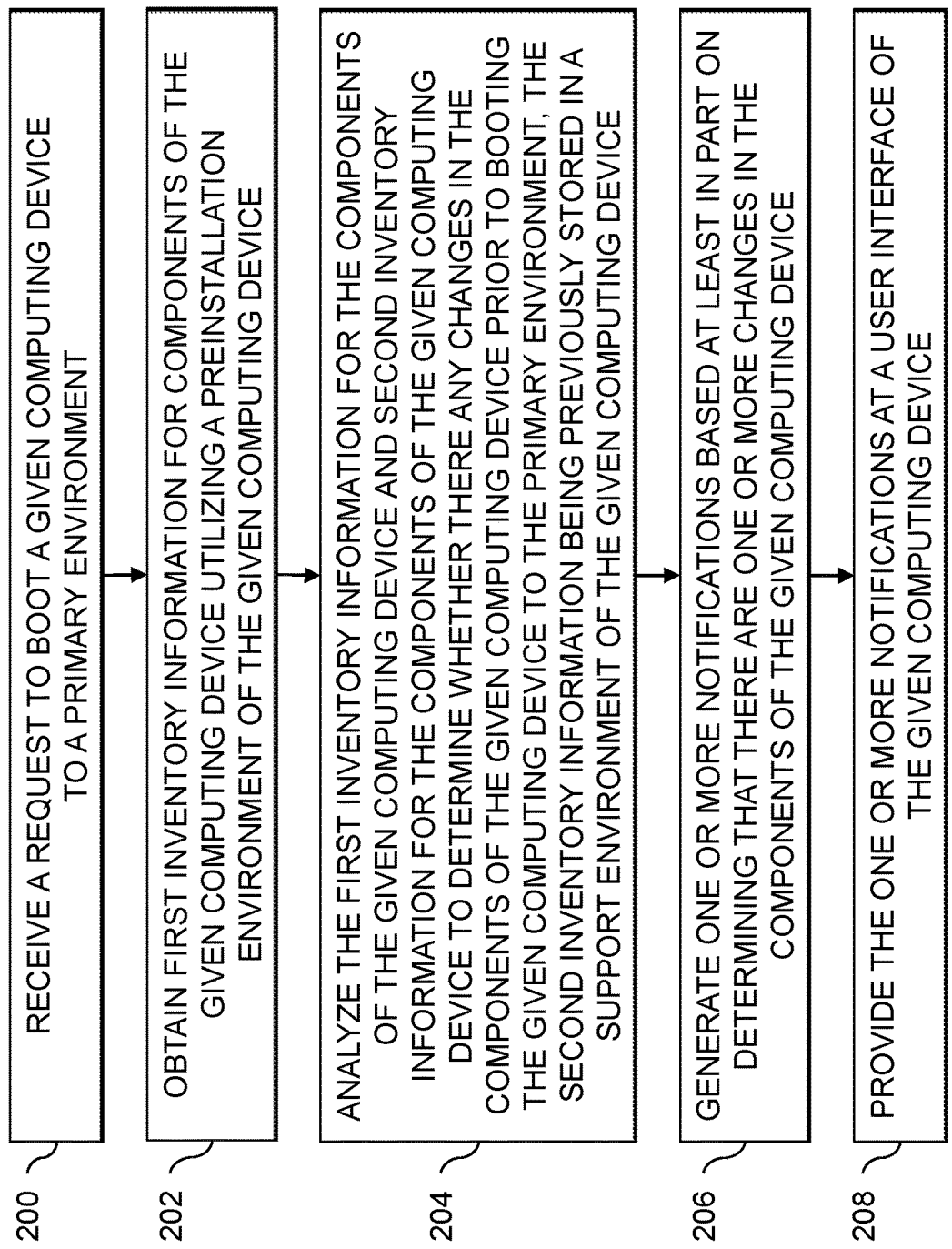
FIG. 2 is a flow diagram of an exemplary process for determining changes to components of a computing device prior to booting to a primary environment of the computing device in an illustrative embodiment.

The FIG. 2 process continues in step 206 with generating one or more notifications based at least in part on determining that there are one or more changes in the components of the given computing device in step 204. In step 208, the one or more notifications are provided at a user interface of the given computing device. Step 206 may include obtaining, from a support platform, support information for the given computing device. The one or more notifications generated in step 206 may comprise an indication of the one or more changes in the components of the given computing device and at least a portion of the support information for the given computing device. The support information for the given computing device may comprise details of whether a support agreement is in place between the given computing device and the support platform. The support information for the given computing device may also or alternatively comprise information relating to at least one of: one or more repair actions performed by the support platform on the given computing device; and one or more troubleshooting actions performed by the support platform on the given computing device. The support information may be obtained from the support platform utilizing a basic input-output system (BIOS) connection interface of the given computing device. The BIOS connection interface of the given computing device may be configured to communicate with a backend interface of the support platform utilizing a HyperText Transfer Protocol Secure (HTTPS) connection. The support information may comprise a report of one or more changes to the components of the given computing device performed by a repair center, and step 206 may be performed responsive to determining that there are one or more changes to the components of the given computing device that are not included in the report of the one or more changes to the components of the given computing device performed by the repair center.

Illustrative embodiments provide techniques for enhancing functionality of a support or other recovery environment of a computing device, where the support or other recovery environment includes tools to diagnose and troubleshoot issues that may occur on the computing device before that computing device boots to its primary OS. The support or other recovery environment, in some embodiments, includes a support or recovery OS (e.g., a Dell SupportAssist OS Recovery). The techniques described herein enhance capabilities of such support or other recovery environments to be able to provide information regarding changes in device information (e.g., an inventory of installed device components of the computing device) without or before booting up the primary OS of the computing device. In some embodiments, the support or other recovery environment is configured to communicate with a support platform backend, such as using a BIOS connection interface (e.g., Dell BIOSConnect) to list down various support information, including but not limited to a purchase date of the computing device, warranty details (e.g., how much is left), the repair cycles or troubleshooting actions performed on the computing device (e.g., changes in device components at an enterprise repair center), etc.

Consider, as an example, a given user that provides a given computing device (e.g., a laptop) for repair to a first repair center. The local repair center informs the given user that an internal component ("Component X") is impacted (e.g., is causing issues on the given computing device, such that the given computing device is not able to boot) and that it might take several days to repair. After several days, the first repair center may return the given computing device to the given user, while informing the given user that the Component X cannot be fixed and that Component X must be replaced. The given user may then decide to perform the replacement of Component X at a second repair center. The second repair center, for example, may be an authorized repair center for a hardware vendor of the given computing device, while the first repair center may be a local or other non-authorized repair center for the hardware vendor of the given computing device. Following replacement of the Component X at the second repair center, the second repair center may inform the given user that another component (e.g., a fan) is not in a working state. The given user may determine that the fan (e.g., the other component of the given computing device not in the working state) is not the fan that was in the given computing device when the given computing device was provided to the first repair center. The given user is not able to check the fan after collecting the given computing device from the first repair center, as the failure of Component X is assumed to prevent the given user from being able to boot the given computing device. The given user is thus unable to determine whether any components of the given computing device were swiped, or if the given user was otherwise cheated in any way by the first repair center (e.g., such as by the first repair center swapping out more expensive for less expensive parts, replacing newer parts with older parts, etc.). There is thus a need for techniques that enable the given user to determine changes in system or device state (e.g., component inventory of the given computing device) when the primary OS of the given computing device has not yet booted up or is not able to boot up.

Figure 3:
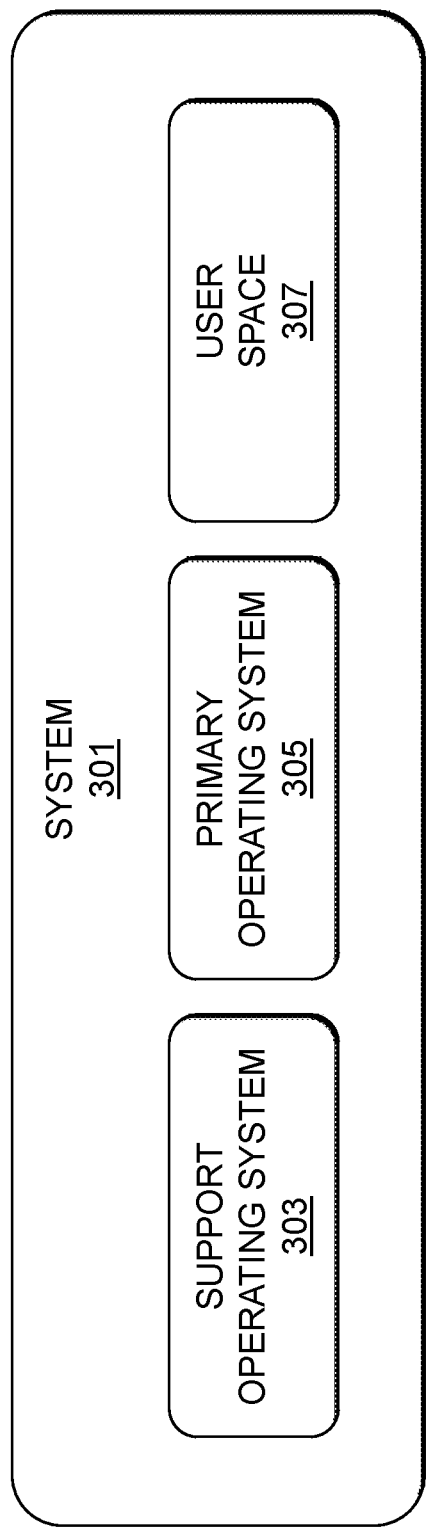
FIG. 3 shows a system configured with primary and support operating systems in an illustrative embodiment.

FIG. 3 shows an example of a system 301 (e.g., a computing device, such as one of the client devices 104) that is configured with a support OS 303, a primary OS 305 and a user space 307. The support OS 303, which may comprise a Dell SupportAssist OS Recovery or other type of support or recovery environment, may occupy a relatively small portion of the storage space of the system 301 (e.g., such as approximately 900 megabytes (MB)) as compared to the primary OS 305 and the user space 307. The support OS 303 may be offered to end-users in various types of service plans, including for systems that are in an out-of-warranty state. For example, the support OS 303 may be used on a device in an out-of-warranty state to resolve issues under a per-incident support agreement to receive technical support from a support platform.

Figure 4:
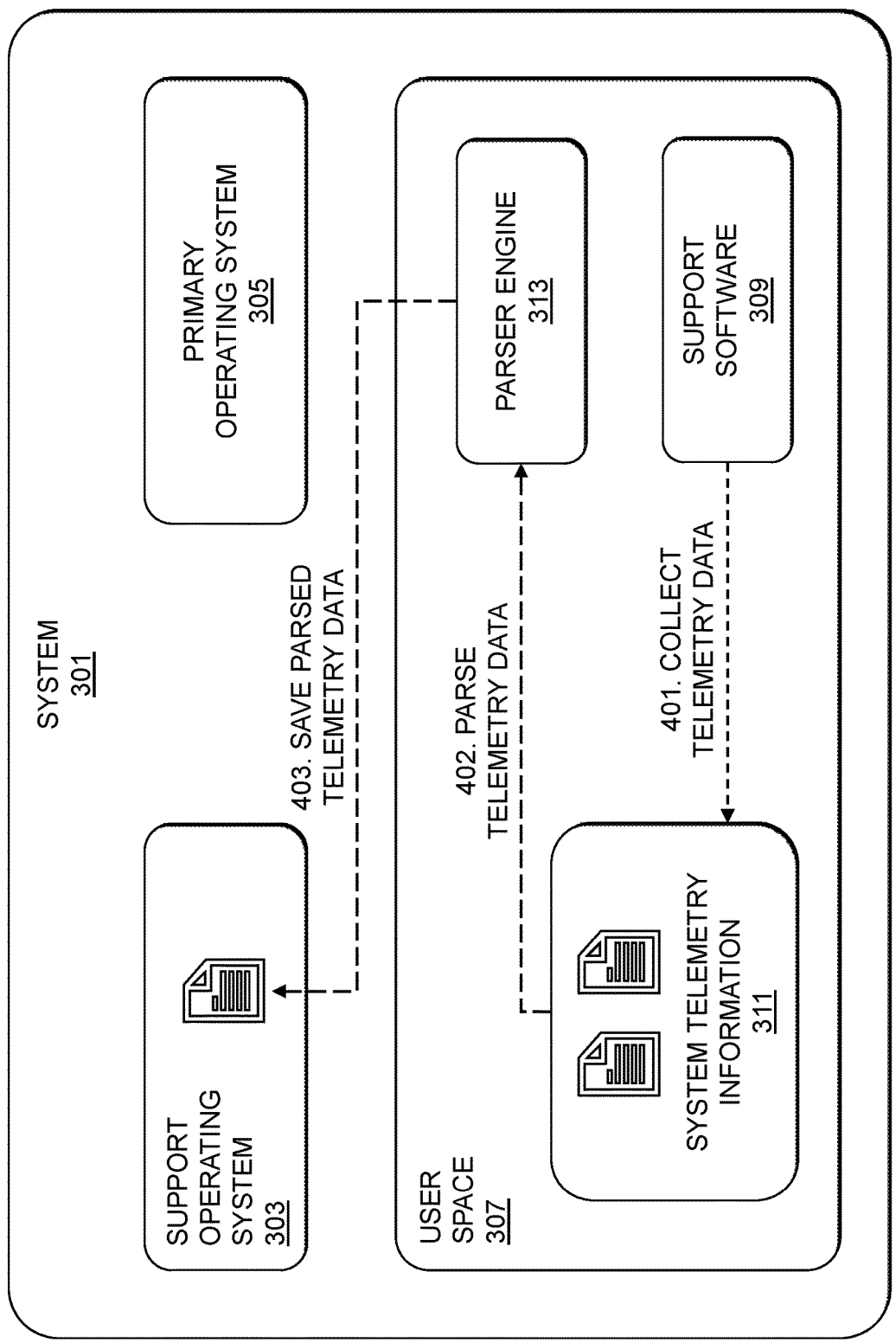
FIG. 4 shows a process flow for providing telemetry data from a user space to the support operating system of the FIG. 3 system in an illustrative embodiment.

FIG. 4 shows a process flow for providing telemetry data from the user space 307 of the system 301 to the support OS 303 of the system 301. In step 401, support software 309 (e.g., Dell SupportAssist) running in the user space 307 of the system 301 will initiate collection of telemetry data. System telemetry information 311 in step 402 sends collected telemetry data to a parser engine 313 in the user space 307. The parser engine 313 will parse the collected telemetry data, which may be very large, and saves parsed telemetry data in the support OS 303 in step 403. The system telemetry information 311 may contain large amounts of data regarding the system 301, but in illustrative embodiments only the system inventory information is needed. Thus, the parser engine 313 is configured to parse the large amount of system telemetry information 311 to obtain the needed system inventory information (e.g., inventory details for components of the system 301, along with UUIDs for such components). The system inventory information, parsed using the parser engine 313 from the system telemetry information 311, is saved to the support OS 303. The support OS 303, for example, may have a designated file or location where a system inventory file or data is designated for storage. If such a file or data already exists in the support OS 303, it may be overridden by default as the current collection of the system inventory will contain the latest inventory.

Figure 5:
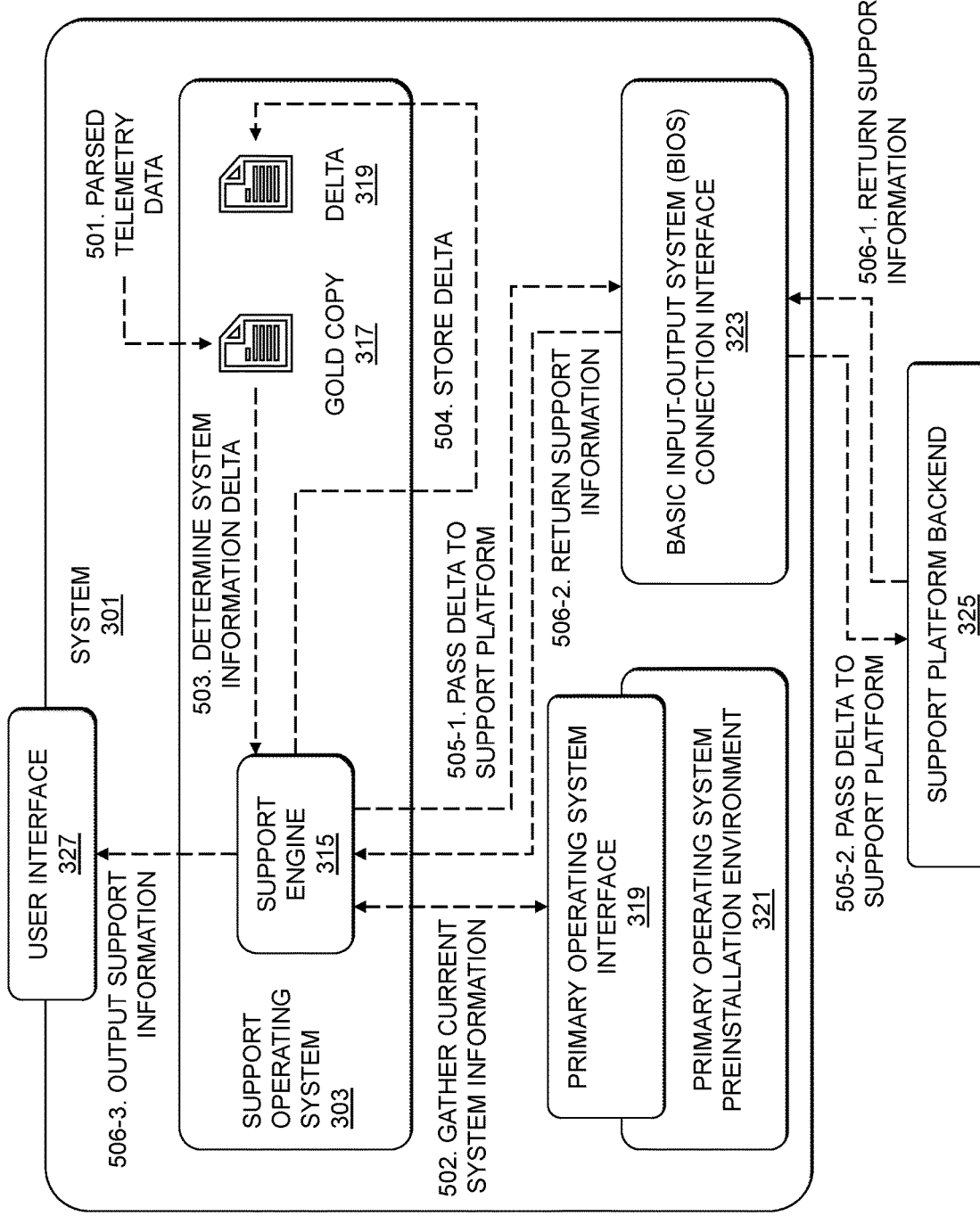
FIG. 5 shows a process flow for obtaining support information from a support platform based on telemetry data stored by a support operating system of the FIG. 3 system in an illustrative embodiment.

FIG. 5 shows a process flow for generating notifications of changes in the system inventory of the system 301. In step 501, it is assumed that the support OS 303 has been provided with parsed telemetry data as a "gold copy" 317 of the current system inventory of the system 301. The gold copy 317 illustratively represents the latest inventory collected by the support software 309 (e.g., a Dell SupportAssist Client) before the system 301 went offline. In step 502, a support engine 315 of the support OS 303 queries a primary OS interface 319 (e.g., an interface of the primary OS 305, such as a Win32 interface for a Windows OS) to gather device or system component information (e.g., motherboard, storage devices, etc.) from a primary OS preinstallation environment 321 (e.g., WinPE for a Windows OS). Step 502 represents current inventory collection for the system 301.

In step 503, the support engine 315 of the support OS 303 compares the current inventory collection (from step 502) with the gold copy 317 to determine a delta 319 therebetween (e.g., changes in devices or components of the system 301). Advantageously, the current inventory collection in step 502 may be performed prior to or without booting the primary OS 305 of the system 301. The support engine 315 in step 504 stores the delta 319 (e.g., the difference between the gold copy 317 inventory collection and the current inventory collection from step 502). The delta 319 reflects changes in the system 301 from the time the system 301 went offline (e.g., when the gold copy 317 was last updated) prior to boot of the primary OS 305 of the system 301.

The delta 319 is provided to a support platform backend 325 via a BIOS connection interface 323 (e.g., Dell BIOSConnect) in step 505. FIG. 5 shows the step 505 broken down into two sub-steps, step 505-1 where the support engine 315 passes the delta 319 to the BIOS connection interface 323, and step 505-2 where the BIOS connection interface 323 passes the delta 319 to the support platform backend 325. The BIOS connection interface 323 illustratively provides an interface that allows a BIOS of the system 301 to connect to the support platform backend 325 (e.g., via an HTTPS connection). The BIOS connection interface 323 may be used for various tasks, such as loading images of OSes (e.g., the support OS 303, the primary OS 305), network-based boot recovery capability (e.g., to perform troubleshooting and repair, such as when a local storage device image is corrupted, replaced or absent). In illustrative embodiments, the BIOS connection interface 323 is used to exchange data (e.g., the delta 319) between the support engine 315 and the support platform backend 325.

The support platform backend 325 uses the delta 319 to determine various support information for the system 301, such as a purchased date of the system 301, warranty details for the system 301 (e.g., time remaining), repair cycles or actions performed on the system 301, etc. Such support information is provided from the support platform backend 325 to a user interface 327 of the system 301 in step 506. As shown in FIG. 5, step 506 is broken into several sub-steps, including step 506-1 where the support platform backend 325 returns the support information to the BIOS connection interface 323, step 506-2 where the BIOS connection interface 323 returns the support information to the support engine 315, and step 506-3 where the support engine 315 returns or outputs the support information to the user interface 327.

FIGS. 6A-6D show examples of pseudocode for obtaining device information from a system (e.g., system 301). The obtained device information shown in FIGS. 6A-6D are examples of device or component inventory information, representing a portion of system telemetry data. More particularly, FIG. 6A shows pseudocode 600 for a PowerShell command for obtaining storage device (e.g., hard drive) information from a system. FIGS. 6B and 6C show pseudocode portions 605-1 and 605-2, respectively, for a PowerShell command for obtaining keyboard information from a system. FIG. 6D shows pseudocode 610 for a PowerShell command for obtaining motherboard information from a system. Various other types of PowerShell commands may be used to obtain system information for other types of device components. It should also be appreciated that other types of commands may be used to obtain system information for device components, including Windows Management Instrumentation (WMI) console (WMIC) commands. For example, the command "wmic diskdrive get Name, Manufacturer, MediaType, SerialNumber" may be used to obtain disk drive information. Other types of commands, such as Get-WMI commands may also be used, such as "Get-WMIObject win32_physicalmedia|Format-List Tag, SerialNumber" to determine hard drive serial numbers, "Get-WMIObject win32_keyboard" to determine keyboard information, etc.

Figure 7:
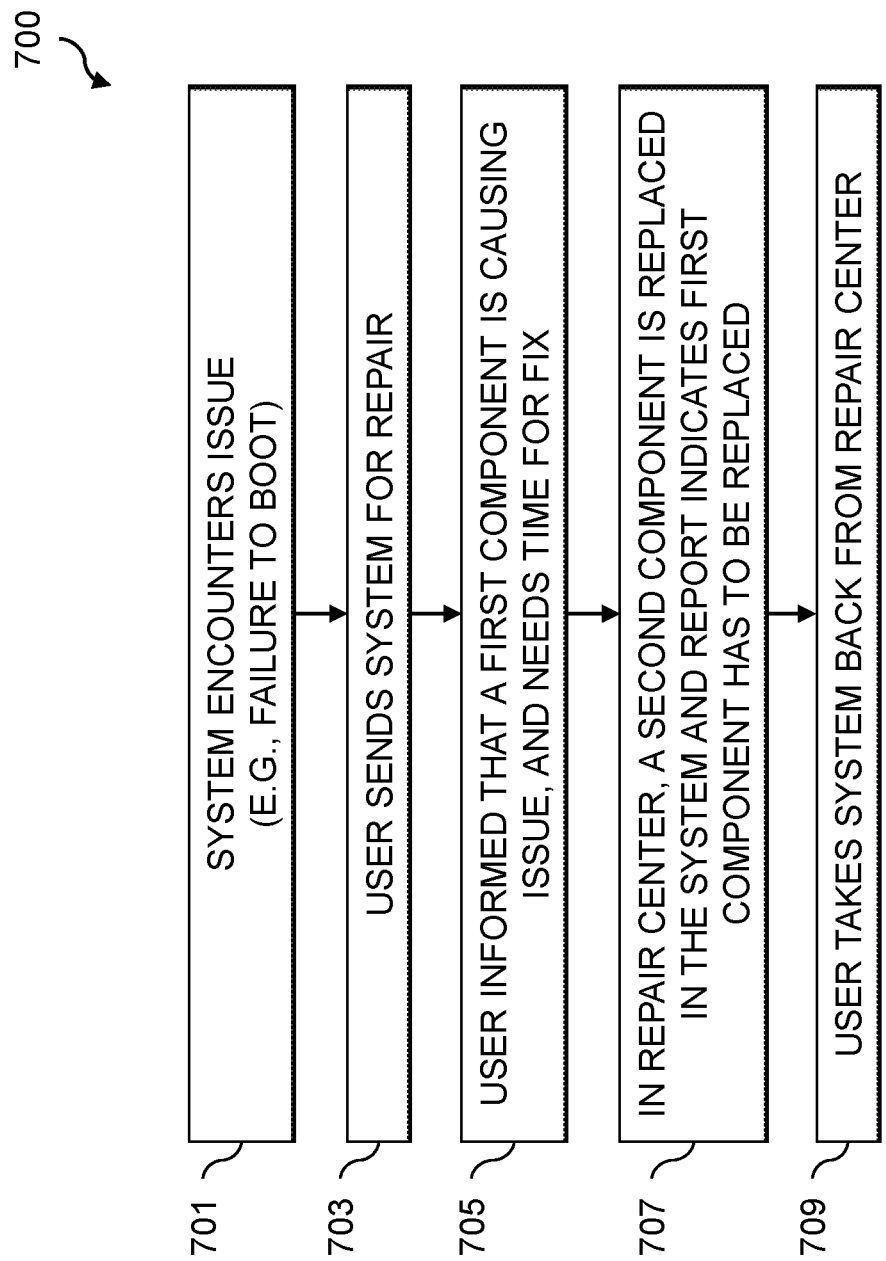
FIG. 7 is a flow diagram of a process for troubleshooting issues encountered on a system in an illustrative embodiment.

FIG. 7 shows a process 700 for troubleshooting issues encountered on a system (e.g., system 301). The process 700 begins in step 701, where the system 301 encounters an issue (e.g., failure to boot). In step 703, a user sends the system 301 in for repair (e.g., to a repair center such as enterprise repair center 102). The user is informed in step 705 that a first component is causing the issue on the system 301, and needs time to be fixed or replaced. In step 707, while the system 301 is at the repair center, a second component is replaced and a report is generated indicating that the first component has to be replaced. The user in step 709 takes the system 301 back from the repair center. The user may take the system 301 back from the repair center prior to the second component being replaced. For example, there may be some delay in getting a replacement component, or the user may use a different repair center for performing the component replacement, etc.

Figure 8:
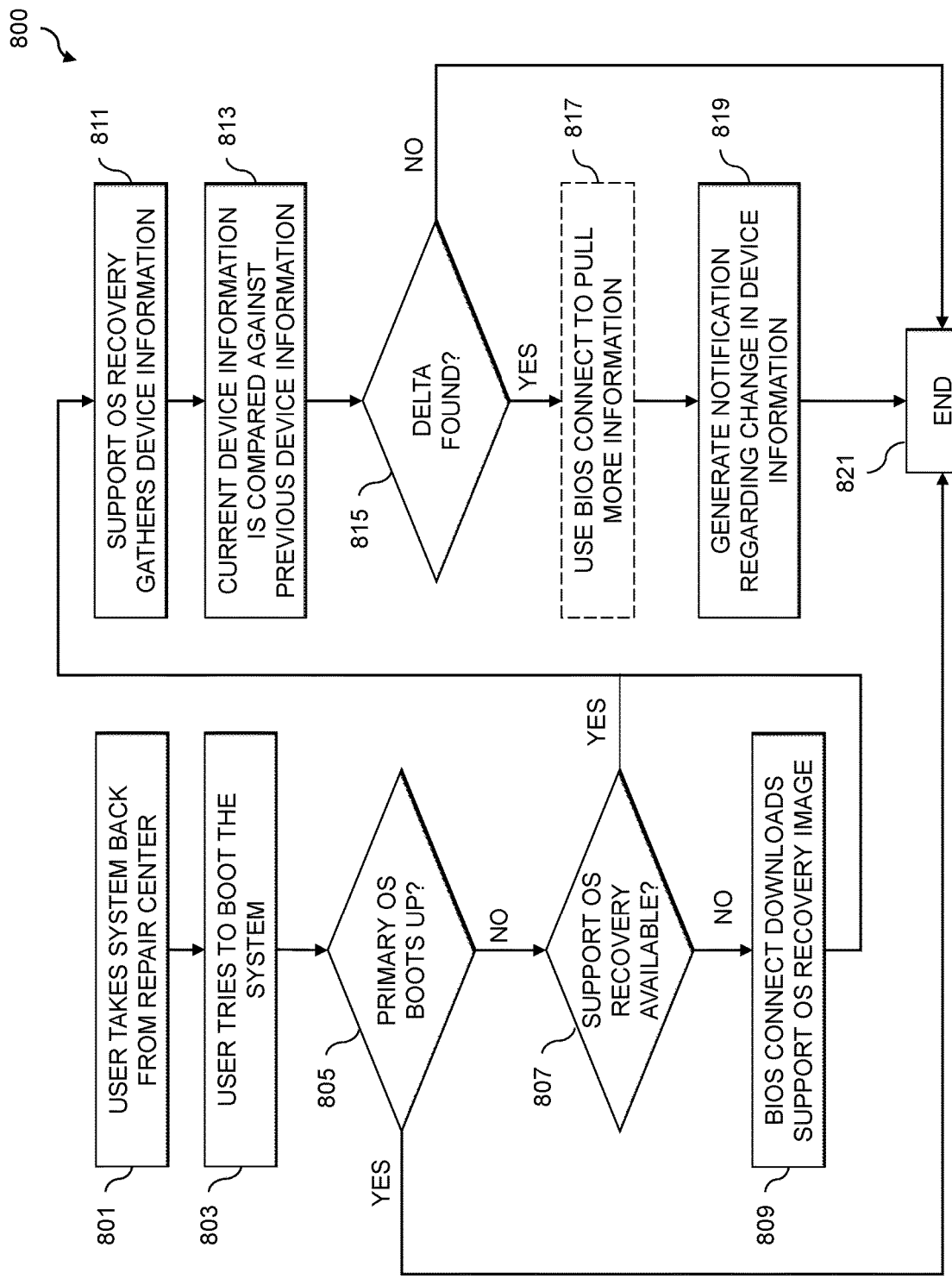
FIG. 8 is a flow diagram of a process for analyzing changes in device information for a system in an illustrative embodiment.

FIG. 8 shows a process 800 for analyzing changes in device information for a system (e.g., the system 301 troubleshooted in the process 700 of FIG. 7). The process 800 begins with the user taking the system 301 back from the repair center in step 801. The user then tries to boot the system 301 in step 803. In step 805, a determination is made as to whether the primary OS 305 of the system 301 is able to boot up. If the result of the step 805 determination is yes, the process 800 ends in step 821. If the result of the step 805 determination is no, the process 800 proceeds to step 807. In step 807, a determination is made as to whether a support OS recovery 303 is available (e.g., in response to the primary OS 305 of the system 301 failing to boot). If the result of the step 807 determination is no, a BIOS connection interface 323 of the system 301 is used in step 809 to download a support OS recovery image to the system 301 and is used to install or initialize the support OS recovery 303.

If the result of the step 807 determination is yes, or following step 809, the process 800 proceeds to step 811 where the support OS recovery 303 (e.g., using support engine 315) gathers current device information (e.g., a component inventory) for the system 301. In step 813, the current device information gathered in step 811 is compared against previous device information (e.g., the gold copy 317). In step 815, a determination is made as to whether there are any changes between the current and previous device information (e.g., whether there is a delta 319 indicating changes in component inventory). If the result of the step 815 determination is no, the process 800 ends in step 821. If the result of the step 815 determination is yes, the process 800 proceeds to step 819 where a notification is generated regarding the change in device information (e.g., indications of the components which were changed). In some embodiments, an optional step 817 is performed prior to step 819, where the BIOS connection interface 323 is used to pull additional information regarding the delta 319, or regarding support available for the system 301 (e.g., purchased data, warranty details such as time remaining, repair cycles or troubleshooting actions performed on the system 301, etc.) from the support platform backend 325. The support platform backend 325 may be part of or be associated with a support platform (e.g., support platform 120). The support platform may itself be part of or be associated with a repair center (e.g., enterprise repair center 102), which may be the same as or different than the repair center from which the system was obtained in step 801. The additional information received from the support platform backend 325 utilizing the BIOS connection interface 323 in step 817 may be used in generating the notifications in step 819.

Illustrative embodiments advantageously provide techniques for detecting and identifying changes in system information (e.g., an inventory of device components of a system). Such techniques may be used irrespective of the underlying, base or primary OS used by a system, and even where the primary OS is not able to boot. The techniques described herein may be used to generate notifications of changes in component inventory of a system, without relying on the primary OS. Such notifications may also include related details for the system, including purchased data, warranty details (e.g., how much is left), repair cycles and troubleshooting actions performed on the system, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for determining changes to components of a computing device prior to booting to a primary environment of the computing device will now be described in greater detail with reference to FIGS. 9 and 10. Although described in the context of system 100, these platforms may also be used to implement at least portions of other information processing systems in other embodiments.

Figure 9:
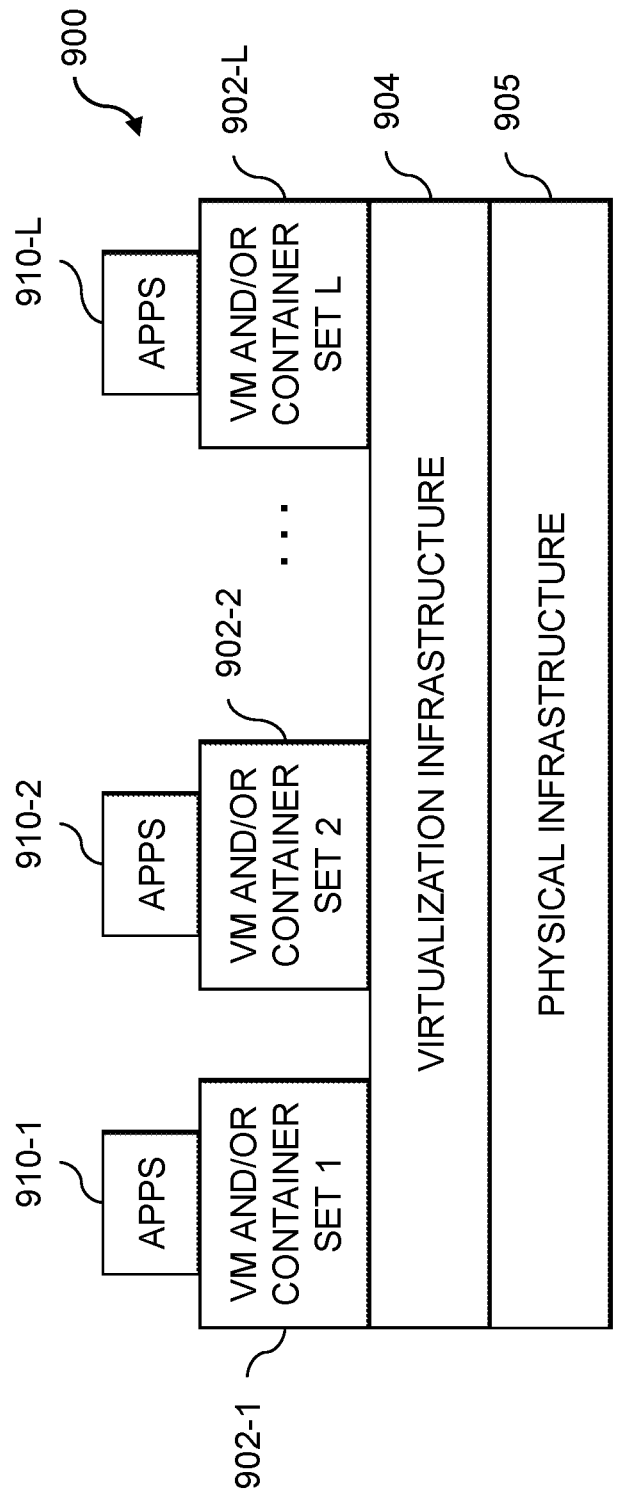

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for determining changes to components of a computing device prior to booting to a primary environment of the computing device as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, end-user devices, support platforms, support software, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
receiving a request to boot a given computing device to a primary environment;
responsive to receiving the request to boot the given computing device to the primary environment, obtaining first inventory information for components of the given computing device utilizing a preinstallation environment of the given computing device;

analyzing the first inventory information for the components of the given computing device and second inventory information for the components of the given computing device to determine whether there any changes in the components of the given computing device prior to booting the given computing device to the primary environment, the second inventory information being previously stored in a support environment of the given computing device;

generating one or more notifications based at least in part on determining that there are one or more changes in the components of the given computing device; and providing the one or more notifications at a user interface of the given computing device;

wherein the primary environment comprises a base operating system of the given computing device;

wherein the support environment comprises a support recovery operating system of the given computing device;

wherein determining that there are one or more changes in the components of the given computing device comprises obtaining, by the support recovery operating system, support information for the given computing device from a support platform external to the given computing device; and wherein the support information comprises at least one of:
  details of whether a support agreement is in place between the given computing device and the support platform; and
  a report of one or more changes to the components of the given computing device performed by one or more repair centers.

2. The apparatus of claim 1 wherein the receiving, obtaining, analyzing, generating and providing steps are performed in the support recovery operating system of the given computing device.

3. The apparatus of claim 2, wherein the support recovery operating system is configured to run independent of the base operating system of the given computing device.

4. The apparatus of claim 1 wherein the first inventory information and the second inventory information comprises hardware device details for the components of the given computing device and universally unique identifiers for the components of the given computing device.

5. The apparatus of claim 1 wherein the second inventory information is stored in the support environment by a support software client executing in the primary environment of the given computing device prior to the primary environment of the given computing device going offline.

6. The apparatus of claim 1 wherein analyzing the first inventory information for the components of the given computing device and the second inventory information for the components of the given computing device to determine whether there any changes in the components of the given computing device is performed responsive to failure to boot the given computing device to the primary environment.

7. The apparatus of claim 1 wherein the one or more notifications comprise an indication of the one or more changes in the components of the given computing device and at least a portion of the support information for the given computing device.

8. The apparatus of claim 1 wherein the support information for the given computing device comprises information relating to at least one of:
  one or more repair actions performed by the support platform on the given computing device; and
  one or more troubleshooting actions performed by the support platform on the given computing device.

9. The apparatus of claim 1 wherein the support information is obtained from the support platform utilizing a basic input-output system connection interface of the given computing device.

10. The apparatus of claim 9 wherein the basic input-output system connection interface of the given computing device is configured to communicate with a backend interface of the support platform utilizing a HyperText Transfer Protocol Secure (HTTPS) connection.

11. The apparatus of claim 1 wherein generating the one or more notifications is performed responsive to determining whether there are one or more changes to the components of the given computing device not included in the report of the one or more changes to the components of the given computing device performed by the one or more repair centers.

12. The apparatus of claim 1 wherein the support platform external to the given computing device is associated with at least one of the one or more repair centers, and at least a portion of the support information for the given computing device obtained from the support platform characterizes one or more actions taken while the given computing device was being serviced by said at least one of the one or more repair centers.

13. The apparatus of claim 1 wherein the obtaining, analyzing, generating and providing are performed prior to booting the given computing device to the primary environment.

14. A computer program product comprising a non-transitory processor-readable storage medium having stored therein program code of one or more software programs, wherein the program code when executed by at least one processing device causes the at least one processing device to perform steps of:

receiving a request to boot a given computing device to a primary environment;

responsive to receiving the request to boot the given computing device to the primary environment, obtaining first inventory information for components of the given computing device utilizing a preinstallation environment of the given computing device;

analyzing the first inventory information for the components of the given computing device and second inventory information for the components of the given computing device to determine whether there any changes in the components of the given computing device prior to booting the given computing device to the primary environment, the second inventory information being previously stored in a support environment of the given computing device;

generating one or more notifications based at least in part on determining that there are one or more changes in the components of the given computing device; and providing the one or more notifications at a user interface of the given computing device;

wherein the primary environment comprises a base operating system of the given computing device;

wherein the support environment comprises a support recovery operating system of the given computing device;

wherein determining that there are one or more changes in the components of the given computing device comprises obtaining, by the support recovery operating system, support information for the given computing device from a support platform external to the given computing device;

wherein the support information comprises at least one of:
  details of whether a support agreement is in place between the given computing device and the support platform; and
  a report of one or more changes to the components of the given computing device performed by one or more repair centers.

15. The computer program product of claim 14 wherein the one or more notifications comprise an indication of the one or more changes in the components of the given computing device and at least a portion of the support information for the given computing device.

16. The computer program product of claim 14 wherein generating the one or more notifications is performed responsive to determining whether there are one or more changes to the components of the given computing device not included in the report of the one or more changes to the components of the given computing device performed by the one or more repair centers.

17. The computer program product of claim 14 wherein the support platform external to the given computing device is associated with at least one of the one or more repair centers, and at least a portion of the support information for the given computing device obtained from the support platform characterizes one or more actions taken while the given computing device was being serviced by said at least one of the one or more repair centers.

18. A method comprising:
  receiving a request to boot a given computing device to a primary environment;
  responsive to receiving the request to boot the given computing device to the primary environment, obtaining first inventory information for components of the given computing device utilizing a preinstallation environment of the given computing device;
  analyzing the first inventory information for the components of the given computing device and second inventory information for the components of the given computing device to determine whether there any changes in the components of the given computing device prior to booting the given computing device to the primary environment, the second inventory information being previously stored in a support environment of the given computing device;
  generating one or more notifications based at least in part on determining that there are one or more changes in the components of the given computing device; and
  providing the one or more notifications at a user interface of the given computing device;

wherein the primary environment comprises a base operating system of the given computing device;

wherein the support environment comprises a support recovery operating system of the given computing device;

wherein determining that there are one or more changes in the components of the given computing device comprises obtaining, by the support recovery operating system, support information for the given computing device from a support platform external to the given computing device;

wherein the support information comprises at least one of:
  details of whether a support agreement is in place between the given computing device and the support platform; and
  a report of one or more changes to the components of the given computing device performed by one or more repair centers; and wherein the method is performed by at least one processing device comprising a processor coupled to a memory.

19. The method of claim 18 wherein the one or more notifications comprise an indication of the one or more changes in the components of the given computing device and at least a portion of the support information for the given computing device.

20. The method of claim 18 wherein generating the one or more notifications is performed responsive to determining whether there are one or more changes to the components of the given computing device not included in the report of the one or more changes to the components of the given computing device performed by the one or more repair centers.

* * * * *